(12) United States Patent
Buchet

(10) Patent No.: US 12,428,125 B2
(45) Date of Patent: Sep. 30, 2025

(54) CLUTCH ASSEMBLY FOR AN AIRCRAFT DOOR

(71) Applicant: Rohr, Inc., Chula Vista, CA (US)

(72) Inventor: Damien Buchet, Toulouse (FR)

(73) Assignee: Rohr, Inc., Chula Vista, CA (US)

( * ) Notice: Subject to any disclaimer, the term of this patent is extended or adjusted under 35 U.S.C. 154(b) by 82 days.

(21) Appl. No.: 18/417,019

(22) Filed: Jan. 19, 2024

(65) Prior Publication Data

US 2024/0246656 A1   Jul. 25, 2024

Related U.S. Application Data

(60) Provisional application No. 63/440,022, filed on Jan. 19, 2023.

(51) Int. Cl.
| | |
|---|---|
| *B64C 1/14* | (2006.01) |
| *E05B 85/10* | (2014.01) |
| *E05B 85/12* | (2014.01) |

(52) U.S. Cl.
CPC ............ *B64C 1/143* (2013.01); *E05B 85/107* (2013.01); *E05B 85/12* (2013.01); *E05Y 2900/502* (2013.01)

(58) Field of Classification Search
CPC ....... B64C 1/143; E05B 85/107; E05B 85/12; E05Y 2900/502; F16D 2023/123; F16D 2023/126; F16D 43/211
See application file for complete search history.

(56) References Cited

U.S. PATENT DOCUMENTS

| | | | |
|---|---|---|---|
| 2,559,736 A * | 7/1951 | Scarborough | ........... E05C 3/122 |
| | | | 292/DIG. 31 |
| 5,156,359 A | 10/1992 | Noble | |
| 5,636,814 A | 6/1997 | Rollert | |

(Continued)

FOREIGN PATENT DOCUMENTS

CN            212336923 U          1/2021

OTHER PUBLICATIONS

EP Search Report for EP Patent Application No. 24152978.3 dated Apr. 24, 2024.

*Primary Examiner* — Huan Le
(74) *Attorney, Agent, or Firm* — Getz Balich LLC

(57) ABSTRACT

A door assembly for an aircraft includes a door, an interior door handle and an exterior door handle, and a clutch assembly. The interior door handle and the exterior door handle are rotatable about a door handle rotational axis. The clutch assembly includes a shaft, an exterior coupling body, an exterior handle body, and a clutch lever. The shaft includes an interface portion. The interface portion includes a handle tooth. The exterior coupling body includes a fixed body portion disposed adjacent the interface portion. The exterior handle body is rotatably mounted to the exterior coupling body. The exterior handle body is rotatable between and to an engaged position and a disengaged position. The clutch lever is rotatably mounted to the exterior coupling body. The clutch lever is pivotable between and to an engaged pivot position and a disengaged pivot position. In the engaged pivot position, the handle tooth is positioned circumferentially between the clutch lever and the fixed body portion.

20 Claims, 9 Drawing Sheets

(56) References Cited

U.S. PATENT DOCUMENTS

| | | | |
|---|---|---|---|
| 8,628,128 B2 * | 1/2014 | Sternberger | B64C 13/00 292/302 |
| 8,998,273 B2 | 4/2015 | Debroucke | |
| 9,752,358 B2 | 9/2017 | Powell | |
| 12,071,215 B2 * | 8/2024 | Rouzade | B64C 1/1423 |
| 2015/0330117 A1 * | 11/2015 | Van Wiemeersch | B60R 21/00 292/96 |
| 2021/0070416 A1 | 3/2021 | Buchet | |

* cited by examiner

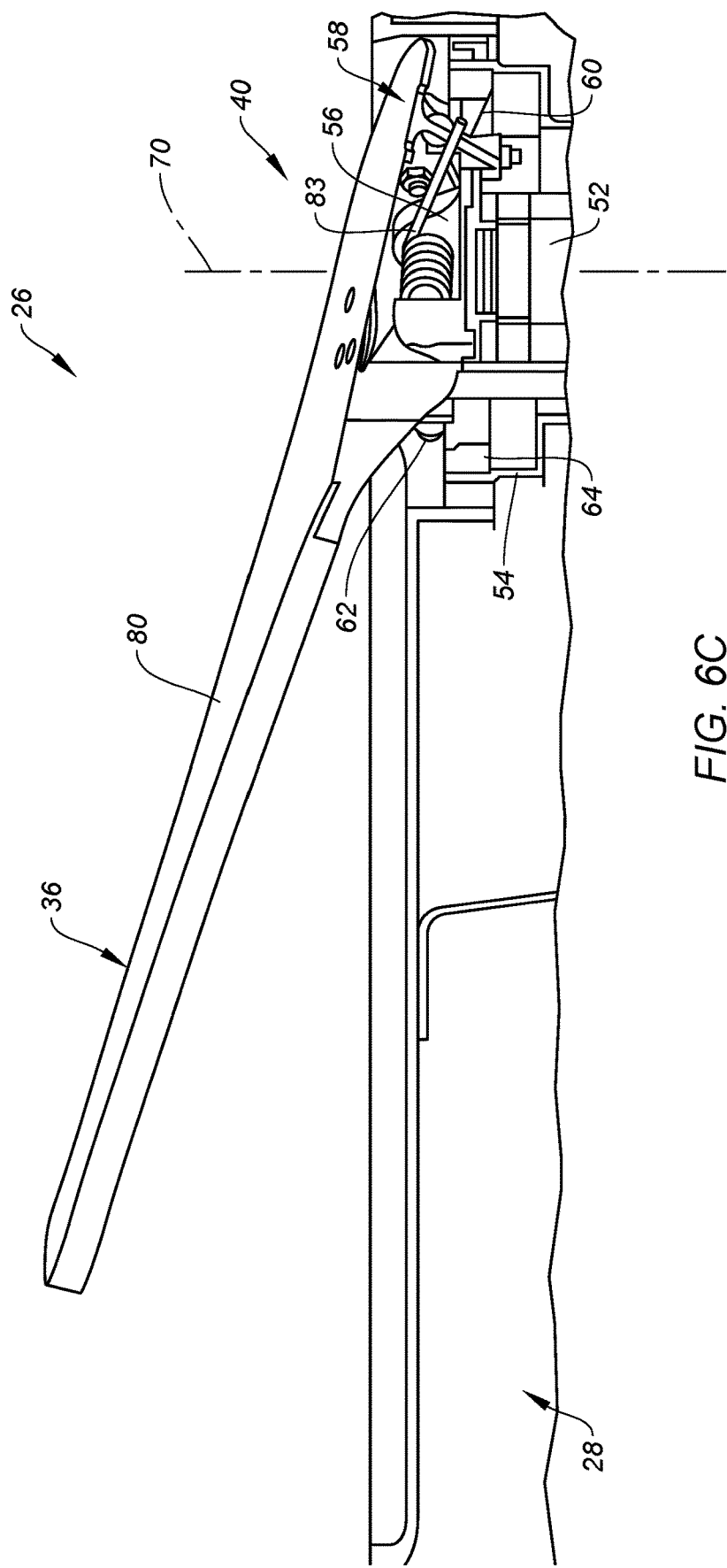

CLUTCH ASSEMBLY FOR AN AIRCRAFT DOOR

This application claims priority to U.S. Patent Appln. No. 63/440,022 filed Jan. 19, 2023, which is hereby incorporated herein by reference in its entirety.

BACKGROUND

1. Technical Field

This disclosure relates generally to an aircraft door assembly and, more particularly, to a clutch assembly for an interior door handle and an exterior door handle of an aircraft door.

2. Background Information

Aircraft doors, such as passenger doors for an aircraft cabin, may be configured to facilitate evacuation of the aircraft in an emergency. Various assemblies for operating aircraft doors for a range of opening and closing movements are known in the art. While these known assemblies have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a door assembly for an aircraft includes a door, an interior door handle and an exterior door handle, and a clutch assembly. The interior door handle and the exterior door handle are rotatable about a door handle rotational axis. The clutch assembly includes a shaft of the interior door handle, an exterior coupling body of the exterior door handle, an exterior handle body of the exterior door handle, and a clutch lever. The shaft extends along the door handle rotational axis to a distal end of the shaft. The shaft includes an interface portion at the distal end. The interface portion includes a handle tooth. The exterior coupling body extends circumferentially about the interface portion. The exterior coupling body includes a fixed body portion disposed radially adjacent the interface portion, relative to the door handle rotational axis. The exterior handle body is rotatably mounted to the exterior coupling body at a first rotational axis. The exterior handle body is rotatable about the first rotational axis between and to an engaged position and a disengaged position. The clutch lever is rotatably mounted to the exterior coupling body at a second rotational axis. The clutch lever is pivotable about the second rotational axis between and to an engaged pivot position and a disengaged pivot position. In the engaged pivot position, the handle tooth is positioned circumferentially between the clutch lever and the fixed body portion to rotationally couple the shaft and the exterior coupling body. In the disengaged pivot position, the clutch lever is configured to permit rotation of the shaft independent of the exterior coupling body.

In any of the aspects or embodiments described above and herein, the clutch assembly may further include a control roller. The control roller may be rotatably mounted to the exterior handle body. The control roller may be positioned in contact with the clutch lever. In the engaged position of the exterior handle body, the control roller may retain the clutch lever in the disengaged pivot position. In the disengaged position of the exterior handle body, the control roller may permit pivoting of the clutch lever from the disengaged pivot position to the engaged pivot position.

In any of the aspects or embodiments described above and herein, the clutch assembly may further include a biasing member biasing the clutch lever in the disengaged position.

In any of the aspects or embodiments described above and herein, the clutch lever may include a center portion, a first arm portion, and a second arm portion. The center portion may be disposed at the second rotational axis. The first arm portion and the second arm portion may extend radially outward from the center portion relative to the second rotational axis. In the engaged pivot position, the handle tooth may be positioned circumferentially between the clutch lever, at a first arm distal end of the first arm portion, and the fixed body portion to rotationally couple the shaft and the exterior coupling body.

In any of the aspects or embodiments described above and herein, the clutch lever may include a clutch roller rotatably mounted to the first arm portion at the first arm distal end. In the engaged pivot position, the handle tooth may be positioned circumferentially between the clutch roller and the fixed body portion to rotationally couple the shaft and the exterior coupling body.

In any of the aspects or embodiments described above and herein, the clutch assembly may further include a control roller. The control roller may be rotatably mounted to the exterior handle body. The control roller may be positioned in contact with a roller track of the second arm portion.

In any of the aspects or embodiments described above and herein, the control roller may be configured to roll along the roller track in a direction from second rotational axis toward a second arm distal end of the second arm portion as the exterior handle body rotates about first rotational axis from the engaged position to the disengaged position.

In any of the aspects or embodiments described above and herein, the exterior coupling body may include one or more bearings contacting and rotatably supporting the shaft.

In any of the aspects or embodiments described above and herein, the clutch assembly may further include a handle push rotatably mounted to the exterior handle body. The handle push may be rotatable between and to an engaged handle push position and a disengaged handle push position. In the engaged handle push position, the handle push may be configured to prevent rotation of the exterior handle body from the engaged position to the disengaged position. In the disengaged handle push position, the handle push may be configured to permit rotation of the exterior handle body from the engaged position to the disengaged position.

In any of the aspects or embodiments described above and herein, the handle push may be configured to contact the exterior coupling body, as the exterior handle body rotates from the engaged position to the disengaged position, to prevent further rotation of the exterior handle body about the first rotational axis in a disengagement rotational direction.

In any of the aspects or embodiments described above and herein, the clutch assembly may further include an exterior handle roller and a roller track. The exterior handle roller may be rotatably mounted to the exterior handle body. Outside of the disengaged position of the exterior handle body, the exterior handle roller may be configured to contact the roller track to prevent rotation of the exterior door handle about the door handle rotation axis in an unlatching rotational direction. In the disengaged position of the exterior handle body, the exterior handle roller may be configured to be separated from the roller track to permit rotation of the exterior door handle about the door handle rotation axis in the unlatching rotational direction.

According to another aspect of the present disclosure, a door assembly for an aircraft includes a door, an interior door handle and an exterior door handle, and a clutch assembly. The interior door handle and the exterior door handle are rotatable about a door handle rotational axis. The clutch assembly includes a shaft of the interior door handle, an exterior coupling body of the exterior door handle, an exterior handle body of the exterior door handle, and a clutch lever. The exterior coupling body extends circumferentially about the shaft. The exterior coupling body includes a fixed body portion disposed radially adjacent the shaft, relative to the door handle rotational axis. The exterior handle body is rotatably mounted to the exterior coupling body at a first rotational axis. The exterior handle body is rotatable about the first rotational axis between and to an engaged position and a disengaged position. The clutch lever includes a center body portion, a first arm portion, a second arm portion, and a clutch roller. The center body portion is rotatably mounted to the exterior coupling body at a second rotational axis. The clutch roller is rotatably mounted to the first arm portion. The clutch lever is pivotable about the second rotational axis between and to an engaged pivot position and a disengaged pivot position. In the engaged pivot position, the shaft is positioned circumferentially between the clutch roller and the fixed body portion to rotationally couple the shaft and the exterior coupling body. In the disengaged pivot position, the clutch roller is disposed radially outward of the shaft relative to the door handle rotational axis.

In any of the aspects or embodiments described above and herein, the first rotational axis may be substantially perpendicular to the door handle rotational axis.

In any of the aspects or embodiments described above and herein, the second rotational axis may be substantially parallel to the door handle rotational axis.

In any of the aspects or embodiments described above and herein, the clutch assembly may further include a control roller. The control roller may be rotatably mounted to the exterior handle body. The control roller may be positioned in contact with the second arm portion. In the engaged position of the exterior handle body, the control roller may retain the clutch lever in the disengaged pivot position. In the disengaged position of the exterior handle body, the control roller may permit pivoting of the clutch lever from the disengaged pivot position to the engaged pivot position.

In any of the aspects or embodiments described above and herein, the first arm portion may be circumferentially offset from the second arm portion relative to the second rotational axis.

According to another aspect of the present disclosure, a door assembly for an aircraft includes a door, an interior door handle and an exterior door handle, and a clutch assembly. The interior door handle and the exterior door handle are rotatable about a door handle rotational axis. The clutch assembly includes a shaft of the interior door handle, an exterior coupling body of the exterior door handle, an exterior handle body of the exterior door handle, a clutch lever, and a control roller. The exterior coupling body extends circumferentially about the shaft. The exterior coupling body includes a fixed body portion disposed radially adjacent the shaft, relative to the door handle rotational axis. The exterior handle body is rotatably mounted to the exterior coupling body at a first rotational axis. The exterior handle body is rotatable about the first rotational axis between and to an engaged position and a disengaged position. The clutch lever is rotatably mounted to the exterior coupling body at a second rotational axis. The clutch lever is pivotable about the second rotational axis between and to an engaged pivot position and a disengaged pivot position. In the engaged pivot position, the shaft is positioned circumferentially between the clutch lever and the fixed body portion to rotationally couple the shaft and the exterior coupling body. In the disengaged pivot position, the clutch lever is configured to permit rotation of the shaft independent of the exterior coupling body. The control roller is rotatably mounted to the exterior handle body. The control roller is positioned in contact with the clutch lever. In the engaged position of the exterior handle body, the control roller retains the clutch lever in the disengaged pivot position. In the disengaged position of the exterior handle body, the control roller permits pivoting of the clutch lever from the disengaged pivot position to the engaged pivot position.

In any of the aspects or embodiments described above and herein, the clutch assembly may further include a biasing member biasing the clutch lever in the disengaged position.

In any of the aspects or embodiments described above and herein, the clutch lever may include a center portion, a first arm portion, and a second arm portion. The center portion may be disposed at the second rotational axis. The first arm portion and the second arm portion may extend radially outward from the center portion relative to the second rotational axis. In the engaged pivot position, the shaft may be positioned circumferentially between the clutch lever, at a first arm distal end of the first arm portion, and the fixed body portion to rotationally couple the shaft and the exterior coupling body.

In any of the aspects or embodiments described above and herein, the clutch lever may include a clutch roller rotatably mounted to the first arm portion at the first arm distal end. In the engaged pivot position, the shaft may be positioned circumferentially between the clutch roller and the fixed body portion to rotationally couple the shaft and the exterior coupling body.

The present disclosure, and all its aspects, embodiments and advantages associated therewith will become more readily apparent in view of the detailed description provided below, including the accompanying drawings.

BRIEF DESCRIPTION OF THE DRAWINGS

FIGS. 6A-C illustrate cutaway views of a portion of the clutch assembly of FIG. 5 for various positions of an exterior door handle for an aircraft door assembly, in accordance with one or more embodiments of the present disclosure.

DETAILED DESCRIPTION

Figure 1:
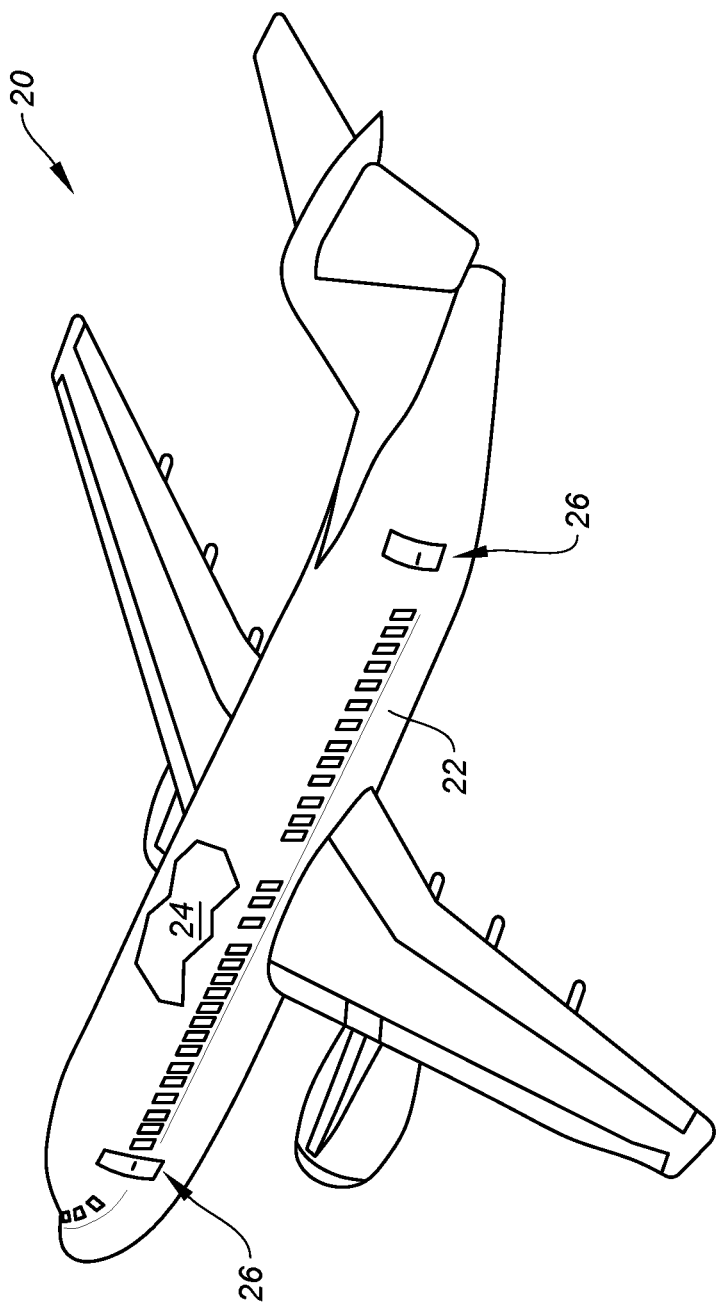
FIG. 1 illustrates a perspective view of an aircraft, in accordance with one or more embodiments of the present disclosure.

FIG. 1 illustrates an aircraft 20 such as an airplane. This aircraft 20 includes a fuselage 22. The fuselage 22 forms and surrounds a cabin 24 (e.g., a passenger cabin, a pressurized compartment, etc.) and other interior compartments (e.g., a cargo bay) of the aircraft 20. The fuselage 22 includes at least one door assembly 26 (e.g., a passenger door assembly, a service door assembly, a cargo door assembly, an emergency exit door assembly, etc.).

Figure 2:
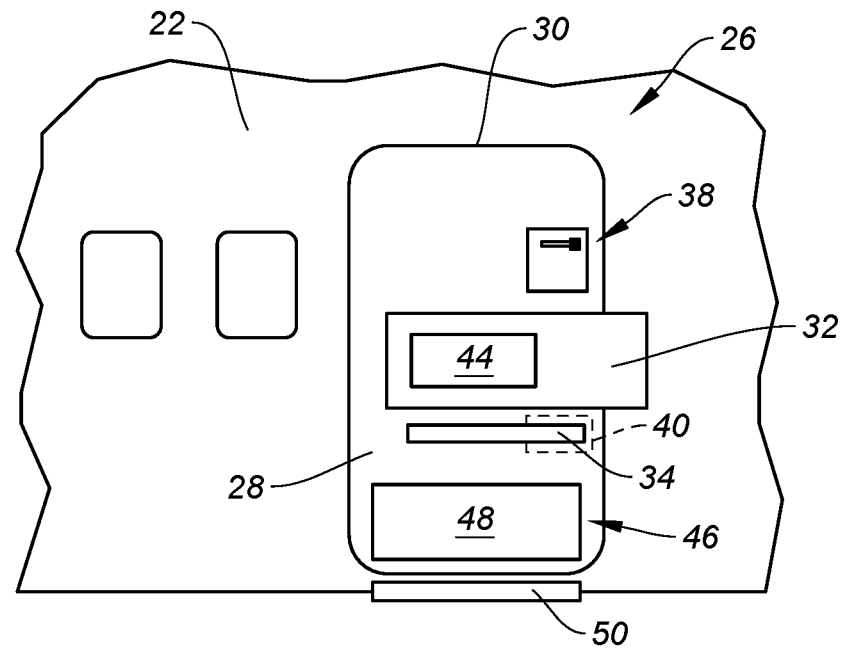
FIG. 2 schematically illustrates an interior of an aircraft door assembly and a surrounding portion of an aircraft fuselage, in accordance with one or more embodiments of the present disclosure.
Figure 3:
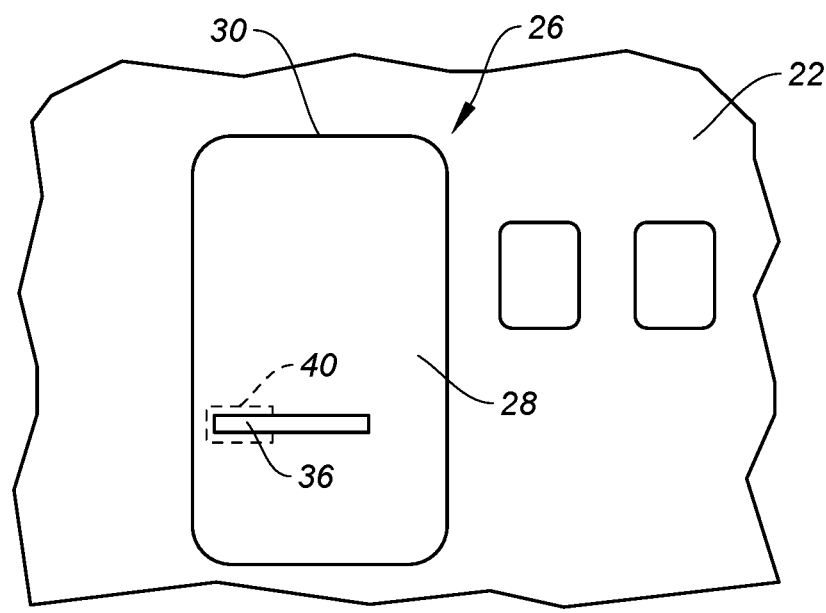
FIG. 3 schematically illustrates an exterior of the aircraft door assembly and a surrounding portion of an aircraft fuselage, in accordance with one or more embodiments of the present disclosure.

Referring to FIGS. 2 and 3, the door assembly 26 includes a door 28, a door frame 30, at least one door hinge 32, an interior door handle 34, an exterior door handle 36, an emergency support system (ESS) 38, and a door handle clutch assembly 40. FIG. 2 schematically illustrates an interior view of the door assembly 26. FIG. 3 schematically illustrates an exterior view of the door assembly 26.

Figure 4A:
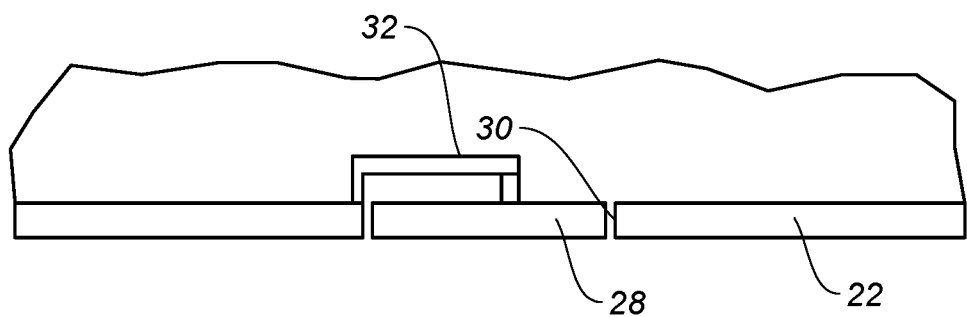
FIGS. 4A-B schematically illustrate the aircraft door assembly with a door in an open position and a closed position, in accordance with one or more embodiments of the present disclosure.
Figure 4B:
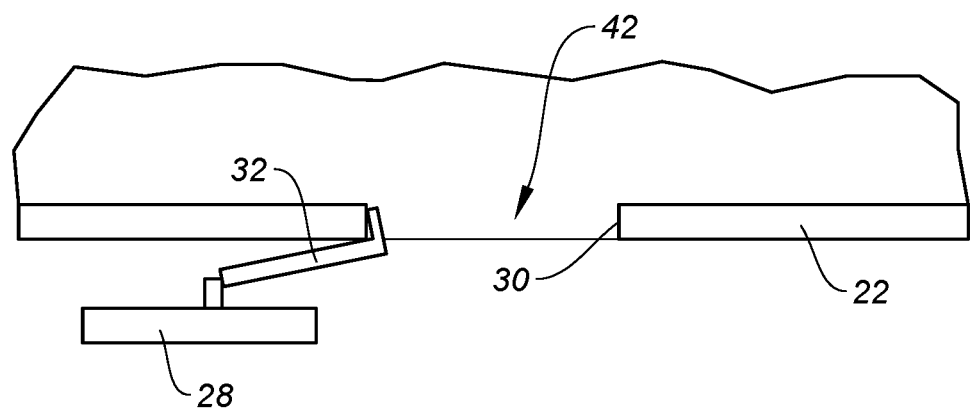
Figure 5:
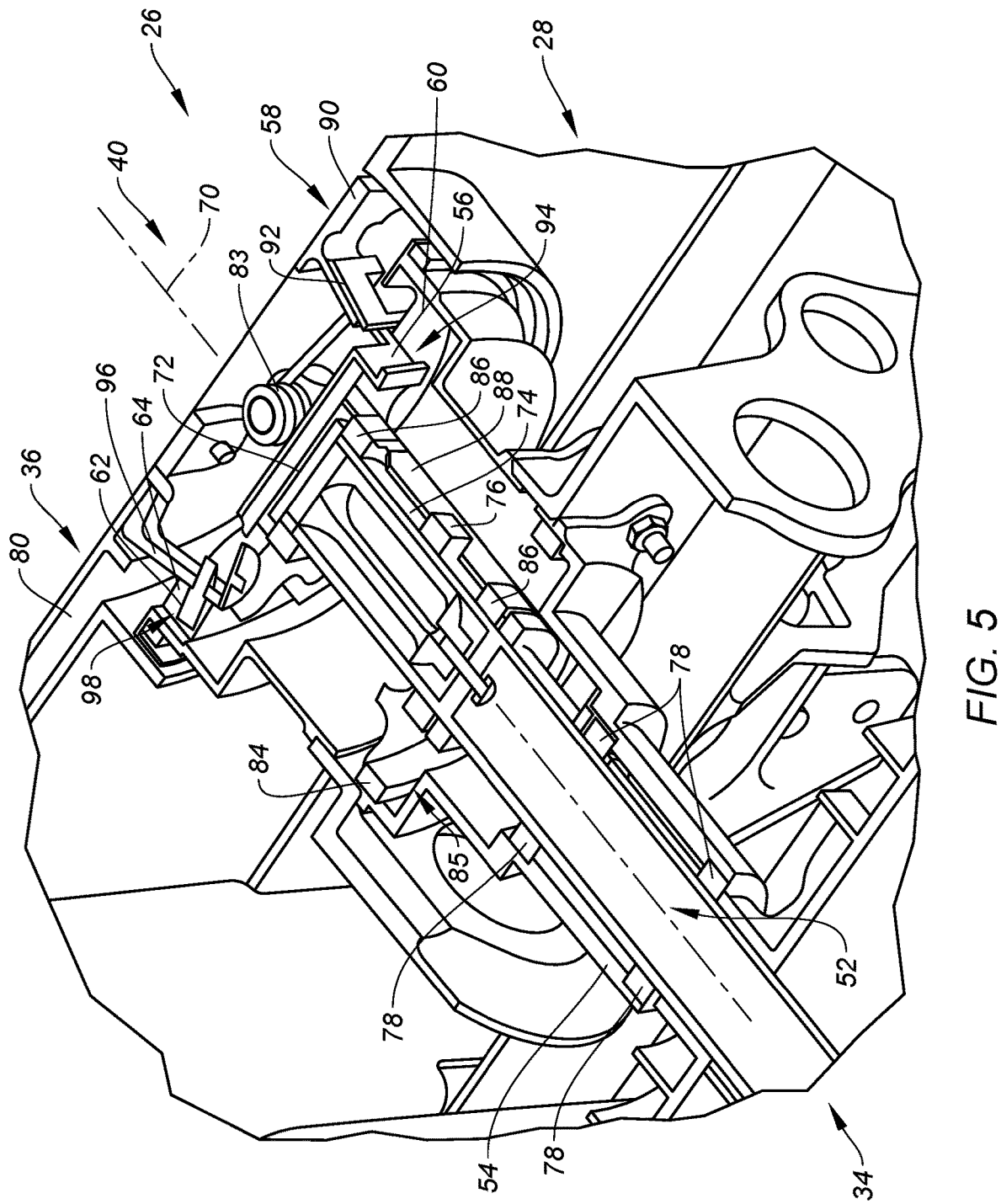
FIG. 5 illustrates a perspective, cutaway view of a portion of a clutch assembly for an aircraft door assembly, in accordance with one or more embodiments of the present disclosure.

The door 28 is configured to move between a stowed, closed position (see FIG. 4A) and a deployed, open position (see FIG. 4B). For example, during opening of the door 28 of FIGS. 4A and 4B, the door 28 moves away from surrounding, fixed portions of the fuselage 22 and out of the door frame 30. The door 28 then translates laterally to a side of the door frame 30 to uncover a door opening 42. This door 28 movement is facilitated by the at least one door hinge 32. The at least one door hinge 32 movable mounts the door 28 to a fixed portion of the fuselage 22.

The door 28 may be opened (or closed) using the interior door handle 34 at an interior of the fuselage 22 and its door 28. The interior door handle 34 is rotatable between and to an unlatched position and a latched position. With the interior door handle 34 in the unlatched position, the door 28 is configured to move from the closed position to the open position. With the interior door handle 34 (and the exterior door handle 36) in the latched position, the door 28 is configured to be securely retained in the closed position (e.g., to seal the pressurized passenger cabin). The door 28 may additionally or alternatively be opened (or closed) using the exterior door handle 36 at an exterior of the fuselage 22 and its door 28. The exterior door handle 36 is rotatable between and to an unlatched position and a latched position. The exterior door handle 36 is rotatable independent of the interior door handle 34. With the exterior door handle 36 in the unlatched position, the door 28 is configured to move from the closed position to the open position. With the exterior door handle 36 (and the interior door handle 34) in the latched position, the door 28 is configured to be securely retained in the closed position (e.g., to seal the pressurized passenger cabin).

The ESS 38 is configured for use during an emergency, for example, to facilitate evacuation of the aircraft 20 using the door assembly 26. The ESS 38 may provide power for moving the door 28 from the closed position to the open position during at least some operating conditions for the door 28, as will be discussed in further detail. For example, the ESS 38 may include an actuation system 44 (sometimes referred to as an emergency puller assist system (EPAS); e.g., a pneumatic actuation system or an electro-mechanical actuation system) configured to assist a user opening the door 28 in an emergency. The actuation system 44 of FIG. 2 is disposed at (e.g., on, adjacent, or proximate) the at least one door hinge 32. The ESS 38 may include an inflatable slide assembly 46. The actuation system 44 may operate in combination with the inflatable slide assembly 46. The inflatable slide assembly 46 of FIG. 2 includes an inflatable slide 48 and a girt bar 50. The inflatable slide 48 may be stored within a portion of the door 28 (e.g., a slide bustle) in an undeployed condition. The girt bar 50 of FIG. 2 may be attached to a floor of the aircraft 20 at (e.g., on, adjacent, or proximate) the door 28. The inflatable slide 48 is fixedly attached to the girt bar 50. During at least some operating conditions for the door 28, such as during an emergency opening of the door for which the ESS 38 (e.g., the actuation system 44) may provide power for moving the door 28 from the closed position to the open position, the opening of the door 28 may pull the inflatable slide 48 from the door 28 (e.g., from the slide bustle). The inflatable slide 48 may then be actuated (e.g., inflated) by a compressed gas cylinder or other system for supplying compressed gas to the inflatable slide 48.

FIGS. 5, 6A-C, and 7A-C illustrate the clutch assembly 40. The exterior door handle 36 may be coupled with and uncoupled from the interior door handle 34 by the clutch assembly 40. Uncoupling of the exterior door handle 36 from the interior door handle 34 may facilitate a reduction in potential injuries for an operator of the exterior door handle 36 (e.g., rescue or other emergency personnel) outside of the aircraft 20 (see FIG. 1) as the door 28 is opened. The uncoupling of the exterior door handle 36 from the interior door handle 34 may additionally facilitate a reduction or elimination of difficulties associated with opening the door 28 using the interior door handle 34, for example, when freezing rain accumulates on and/or about the exterior door handle 36 or the exterior door handle 36 experiences some other form of physical obstruction. The clutch assembly 40 of FIGS. 5 and 6A-C includes a shaft 52 of the interior door handle 34, a handle box 54, an exterior coupling body 56 of the exterior door handle 36, a handle push 58, a retainer 60, an exterior handle roller 62 of the exterior door handle 36, a roller track 64, a clutch lever 66, and a control roller 68 of the exterior door handle 36.

The interior door handle 34 includes or otherwise forms the shaft 52. The shaft 52 extends circumferentially about (e.g., completely around) a door handle rotational axis 70 of the interior door handle 34 and the exterior door handle 36. The interior door handle 34 (and its shaft 52) and the exterior door handle 36 are configured to rotate about the door handle rotational axis 70 between their respective latched and unlatched positions. The shaft 52 extends along the door handle rotational axis 70 to a distal end 72 of the shaft 52. The distal end 72 is disposed at (e.g., on, adjacent, or proximate) the exterior door handle 36. The shaft 52 includes an interface portion 74 disposed at (e.g., on, adjacent, or proximate) the distal end 72. The interface portion 74 may be a shaft extension coupled (e.g., with one or more mechanical fasteners) to a second portion of the shaft 52. Alternatively, the interface portion 74 may be a portion of a monolithic configuration of the shaft 52.

The interface portion 74 includes or otherwise forms a handle tooth 76. The handle tooth 76 may be configured as a single protrusion of the interface portion 74 extending radially outward from surrounding surfaces of the interface portion 74, relative to the door handle rotational axis 70. The handle tooth 76 is disposed along a circumferential portion of an outer perimeter of the interface portion 74, relative to the door handle rotational axis 70. The interface portion 74 may also include or otherwise form a recess 77. The recess 77 may be configured as a single recess of the interface portion 74 extending radially inward from surrounding surfaces of the interface portion 74, relative to the door handle rotational axis 70. The recess 77 is disposed along a circumferential portion of an outer perimeter of the interface portion 74, relative to the door handle rotational axis 70. The recess 77 may be axially coincident with the handle tooth 76, relative to the door handle rotational axis 70. The recess 77 may be circumferentially disposed at (e.g., on, adjacent, or proximate) the handle tooth 76.

The handle box 54 extends circumferentially about (e.g., completely around) the door handle rotational axis 70. The handle box 54 surrounds and supports the shaft 52 and the exterior coupling body 56 along the door handle rotational axis 70. The handle box 54 may include one or more bearings 78 (e.g., ball bearings) configured to support the shaft 52 and to facilitate rotation of the shaft 52 about the door handle rotational axis 70.

The exterior coupling body 56 extends circumferentially about (e.g., completely around) the door handle rotational axis 70. All or a substantial portion of the exterior coupling body 56 may be disposed within the door 28 (see FIGS. 1-4). The exterior coupling body 56 is rotatably mounted to an exterior handle body 80 of the exterior door handle 36 (e.g., by a pin, a shaft, or another mechanical fastener). The exterior handle body 80 is disposed at (e.g., on, adjacent, or proximate) an exterior of the door 28. The exterior coupling body 56 is rotatably mounted to the exterior handle body 80 along a rotational axis 82. The rotational axis 82 may extend perpendicular to or substantially perpendicular to the door handle rotational axis 70. The exterior handle body 80 is configured to rotate relative to the exterior coupling body 56 about the rotational axis 82 to disengage from the door 28 as shown, for example, in the sequence from FIG. 6A to FIG. 6B. The exterior handle body 80 is rotatable about the rotational axis 82 between and to an engaged position of the exterior handle body 80 (e.g., where the exterior handle body 80 is disposed flush against the door 28; see FIG. 6A) and a disengaged position of the exterior handle body 80 (e.g., where the exterior handle body 80 extends away from the door 28; see FIG. 6B). The exterior handle body 80 may be biased in the disengaged position. For example, the exterior handle body 80 may be biased in the disengaged position by a biasing spring 83 disposed about the rotational axis 82. The exterior coupling body 56 and the exterior handle body 80 are configured for rotation together about the door handle rotational axis 70 between and to the unlatched position and the latched position of the exterior door handle 36.

The exterior coupling body 56 extends along the door handle rotational axis 70 from the exterior handle body 80 to a distal end 85 of the exterior coupling body 56. The exterior coupling body 56 surrounds and supports the shaft 52. For example, the exterior coupling body 56 may surround and support the interface portion 74. The interface portion 74 may be disposed axially within (e.g., entirely axially within) the exterior coupling body 56, relative to the door handle rotational axis 70. The exterior door handle 36 may include one or more first bearings 84 (e.g., ball bearings) and one or more second bearings 86 (e.g., ball bearings). The first bearings 84 may be disposed at (e.g., on, adjacent, or proximate) an outer radial side of the exterior coupling body 56, relative to the door handle rotational axis 70. The first bearings 84 may be disposed in contact with the exterior coupling body 56 and the handle box 54 to support the exterior coupling body 56 and to facilitate rotation of the exterior coupling body 56 about the door handle rotational axis 70. The second bearings 86 may be disposed at (e.g., on, adjacent, or proximate) an inner radial side of the exterior coupling body 56, relative to the door handle rotational axis 70. The second bearings 86 may be disposed in contact with the exterior coupling body 56 and the shaft 52 (e.g., the interface portion 74) to support the shaft 52 and to facilitate rotation of the shaft 52 about the door handle rotational axis 70. The exterior coupling body 56 includes or otherwise forms a fixed body portion 88 (e.g., a fixed bolt) of the exterior coupling body 56. The fixed body portion 88 extends from surrounding portions of the exterior coupling body 56 parallel to or substantially parallel to the door handle rotational axis 70. The fixed body portion 88 is axially and radially coincident with the handle tooth 76, relative to the door handle rotational axis 70.

Figure 6A:
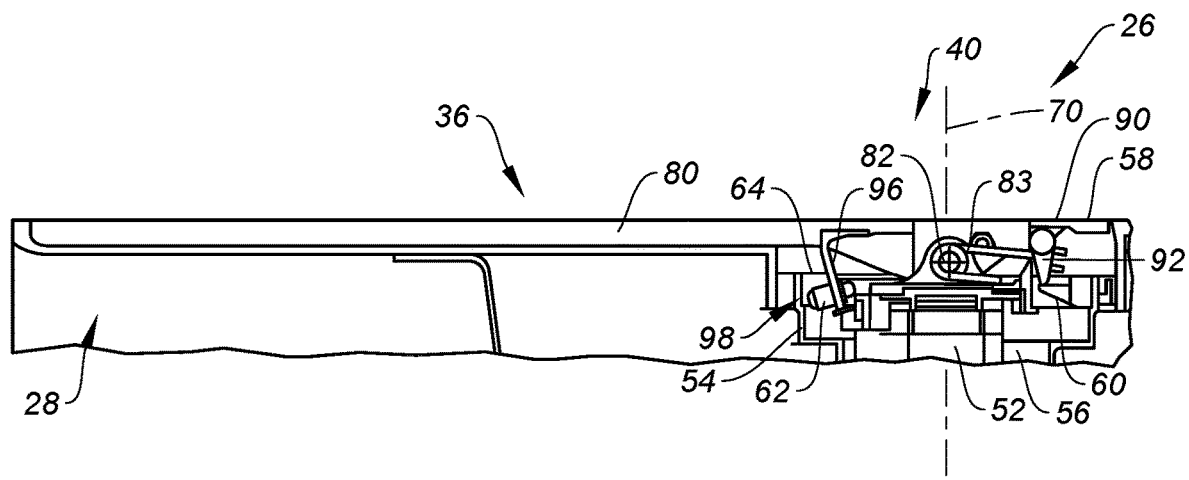
Figure 6B:
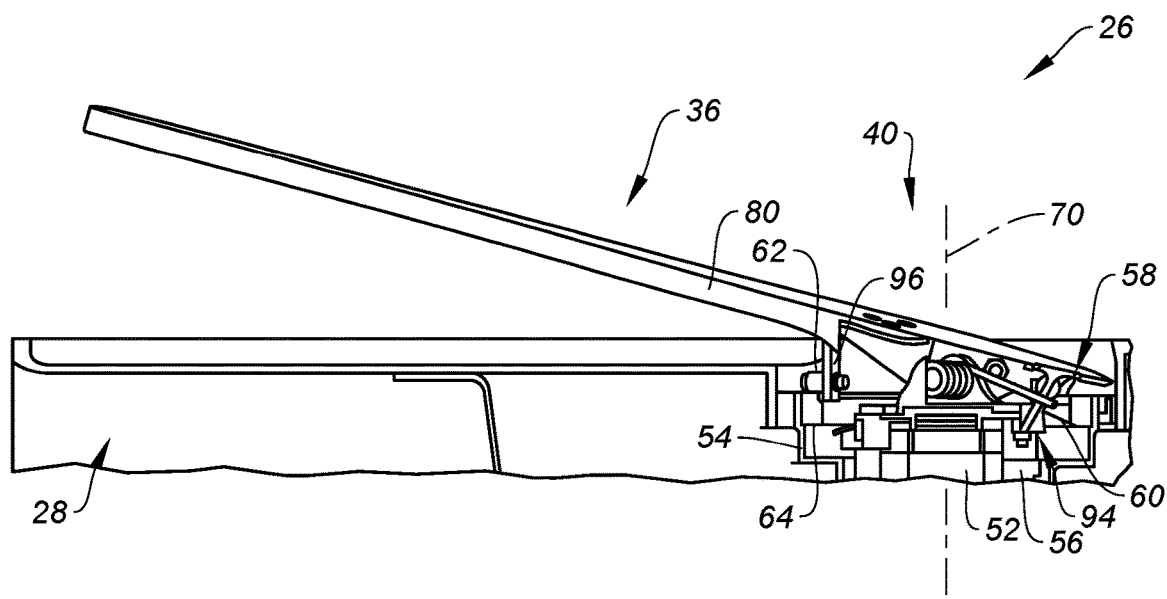

The handle push 58 is disposed at (e.g., on, adjacent, or proximate) the exterior handle body 80 and the exterior of the door 28 (see FIGS. 1-4). The handle push 58 may include an actuation portion 90 and a locking portion 92. The actuation portion 90 may be disposed at (e.g., on, adjacent, or proximate) the exterior of the door 28 while the locking portion 92 may be disposed within the door 28. The actuation portion 90 may extend orthogonally or substantially orthogonally from the locking portion 92. The handle push 58 may be rotatably mounted to the exterior handle body 80. The handle push 58 may be rotatable between an engaged position and a disengaged position. In the engaged position of the handle push 58, the locking portion 92 may be disposed at (e.g., on, adjacent, or proximate) the retainer 60 to prevent rotation of the exterior handle body 80 about the rotational axis 82 (e.g., against the biasing force of the biasing spring 83) from the engaged position of the exterior handle body 80 to the disengaged position of the exterior handle body 80 (e.g., by the retainer 60 obstructing rotation of the exterior handle body 80 and the handle push 58 about the rotational axis 82). The handle push 58 may be biased in the engaged position (e.g., by a biasing spring). For example, a portion of the biasing spring 83 may contact the locking portion 92 to oppose rotation of the handle push 58 from the engaged position to the disengaged position (see, e.g., FIG. 7A). The handle push 58 may be positioned (e.g., rotated) by an operator from the engaged position to the disengaged position by pushing against the actuation portion 90. In the disengaged position of the handle push 58, the locking portion 92 may be separated from the retainer 60 to permit rotation of the exterior handle body 80 (e.g., about the rotational axis 82) from the engaged position of the exterior handle body 80 to the disengaged position of the exterior handle body 80. The retainer 60 may be attached to or formed by the door 28, the handle box 54, or another structure of the door assembly 26 (see FIGS. 1-4) and positioned to contact the locking portion 92 with the handle push 58 in the engaged position. For example, the retainer 60 of FIGS. 6A-C is attached to or otherwise formed by the handle box 54 (e.g., an interior of the handle box 54).

The handle push 58 may additionally form a rotation stop 94 for the exterior door handle 36. As shown, for example, in the sequence from FIG. 6A to FIG. 6C, as the exterior handle body 80 is rotated (e.g., about the rotational axis 82) from the engaged position to the disengaged position, the locking portion 92 may contact the exterior coupling body, thereby prevent further rotation of the exterior handle body 80 about the rotational axis 82 in the disengagement direction.

The exterior handle roller 62 is rotatably mounted to the exterior handle body 80. For example, the exterior handle roller 62 may be rotatably mounted to the exterior handle body 80 by an arm 96 of the exterior handle body 80. The exterior handle roller 62 may be positioned on the arm 96 extending radially away from an interface of the exterior coupling body 56 and the exterior handle body 80, relative to the door handle rotational axis 70. With the exterior door handle 36 in its latched position (e.g., relative to the door handle rotational axis 70), the exterior handle roller 62 may be configured to roll along the roller track 64 as the exterior handle body 80 is moved between the engaged and the disengaged positions of the exterior handle body 80, thereby supporting and facilitating stability of the exterior handle body 80 as the exterior handle body 80 is moved between the engaged and the disengaged positions. The exterior handle roller 62 and the roller track 64 may form a rotation stop 98 for the exterior door handle 36 in the unlatch direction. For example, as shown in FIG. 6A, the roller track 64 may obstruct rotation of the exterior handle roller 62, and hence the exterior door handle 36, about the door handle rotational axis 70 in the unlatch direction with the exterior handle body 80 in the engaged position or in a partially disengaged position (e.g., not fully in the disengaged position). Accordingly, the rotation stop 98 may prevent rotation of the exterior door handle 36 about the door handle rotational axis 70 from the latched position of the exterior door handle 36 until the exterior handle body 80 is in the disengaged position. As shown in FIGS. 6B and 6C, in the disengaged position of the exterior handle body 80, the exterior handle roller 62 may be separated from the roller track 64, thereby permitting rotation of the exterior door handle 36 about the door handle rotational axis 70 from the latched position to the unlatched position of the exterior door handle 36. The roller track 64 may be attached to or formed by the door 28, the handle box 54, or another structure of the door assembly 26 (see FIGS. 1-4) and positioned to contact the exterior handle roller 62 with the exterior handle body 80 in the engaged position. For example, the roller track 64 of FIGS. 6A-C is attached to or otherwise formed by the handle box 54 (e.g., an interior of the handle box 54).

The clutch lever 66 is disposed within the exterior coupling body 56 radially adjacent the interface portion 74. The clutch lever 66 is rotatably mounted to the exterior coupling body 56 along a rotational axis 100. The rotational axis 100 may be parallel to or substantially parallel to the door handle rotational axis 70. The clutch lever 66 includes a lever body 102 and a clutch roller 104. The lever body 102 includes a center portion 106, a first arm portion 108, and a second arm portion 110. The center portion 106 is disposed at (e.g., on, adjacent, or proximate) the rotational axis 100. The center portion 106 may be rotatably mounted to the exterior coupling body 56 along the rotational axis 100. The first arm portion 108 extends radially outward from the center portion 106 to a first distal end 112 of the first arm portion 108, relative to the rotational axis 100. The second arm portion 110 extends radially outward from the center portion 106 to a second distal end 114 of the second arm portion 110, relative to the rotational axis 100. The first arm portion 108 and its first distal end 112 are circumferentially offset from the second arm portion 110 and its second distal end 114, relative to the rotational axis 100. The clutch roller 104 is rotatably mounted to the first arm portion 108 at (e.g., on, adjacent, or proximate) the first distal end 112. The clutch roller 104 is disposed axially coincident with the handle tooth 76 and the recess 77, relative to the door handle rotational axis 70. The lever body 102 may form or otherwise include a fixed body portion of the lever body 102 at (e.g., on, adjacent, or proximate) the first distal end 112, as an alternative to the clutch roller 104. The second arm portion 110 forms a roller track 116. The roller track 116 may be formed by a roller surface 118 of the second arm portion 110 extending between and to the center portion 106 and the second distal end 114. The roller surface 118 may face radially outward from the interface portion 74, relative to the door handle rotational axis 70. The roller surface 118 may include a first surface portion 120 and a second surface portion 122. The first surface portion 120 may extend between and to the center portion 106 and the second surface portion 122. The second surface portion 122 may extend between and to the first surface portion 120 and the second distal end 114. The first surface portion 120 and the second surface portion 122 may intersect at an edge 124 such that the first surface portion 120 and the second surface portion 122 face in different directions.

The clutch lever 66 is pivotable about the rotational axis 100 between and to a disengaged pivot position and an engaged pivot position. The clutch lever 66 may be biased in the engaged pivot position by a biasing member 126 (e.g., a spring). In the disengaged pivot position of the clutch lever 66, the clutch roller 104 may be disposed radially outward of the handle tooth 76. In the engaged pivot position of the clutch lever 66, the clutch roller 104 may be disposed radially coincident with the handle tooth 76.

The control roller 68 is rotatably mounted to the exterior handle body 80. For example, the control roller 68 may be rotatably mounted to the exterior handle body 80 by an arm 128 of the exterior handle body 80. The controller roller 68 is disposed on the roller track 116 (e.g., the roller surface 118) and configured to roll along the roller track 116.

Figure 7A:
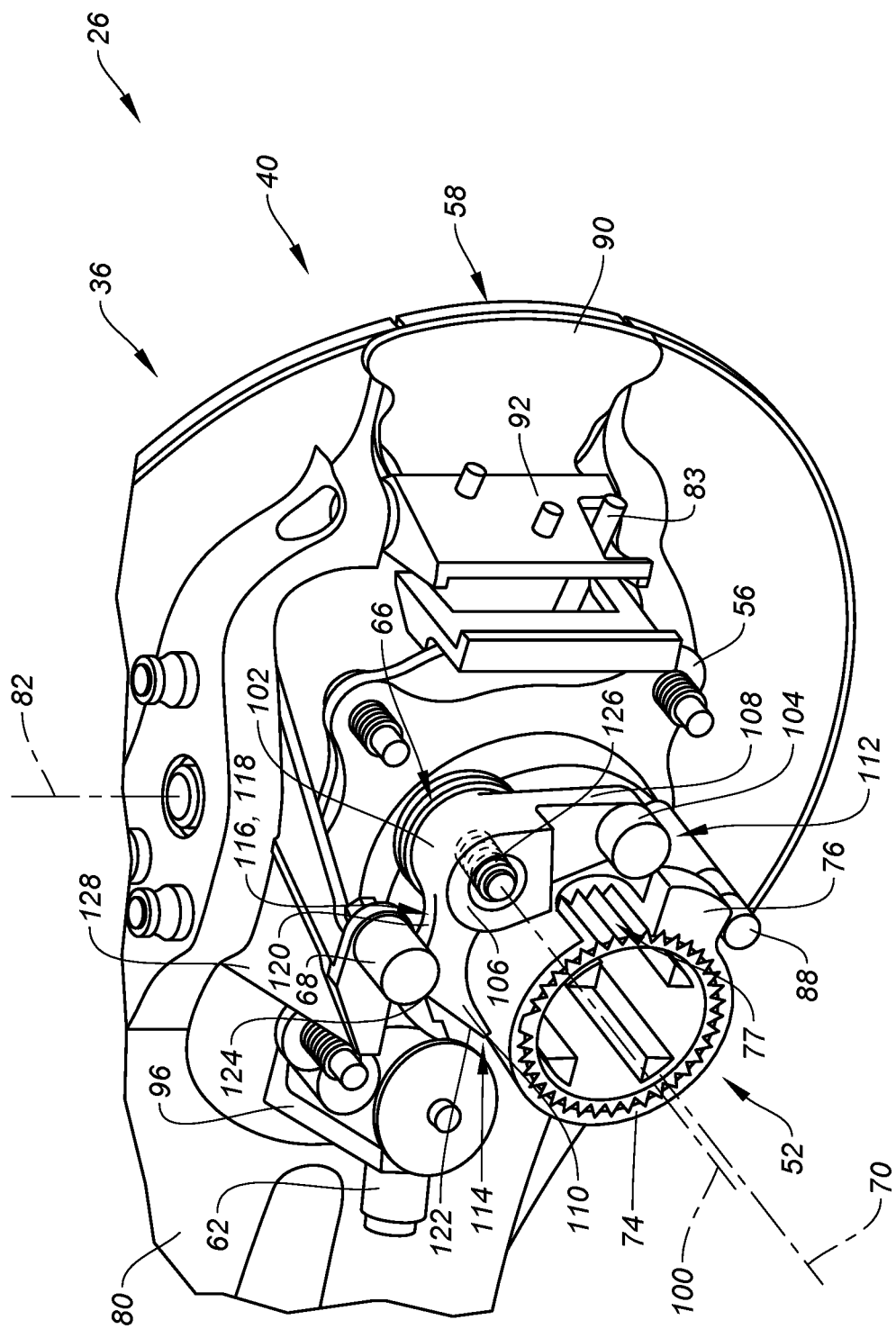
FIGS. 7A-C illustrate perspective, cutaway views of another portion of the clutch assembly of FIG. 5 for various positions of an exterior door handle for an aircraft door assembly, in accordance with one or more embodiments of the present disclosure.
Figure 7B:
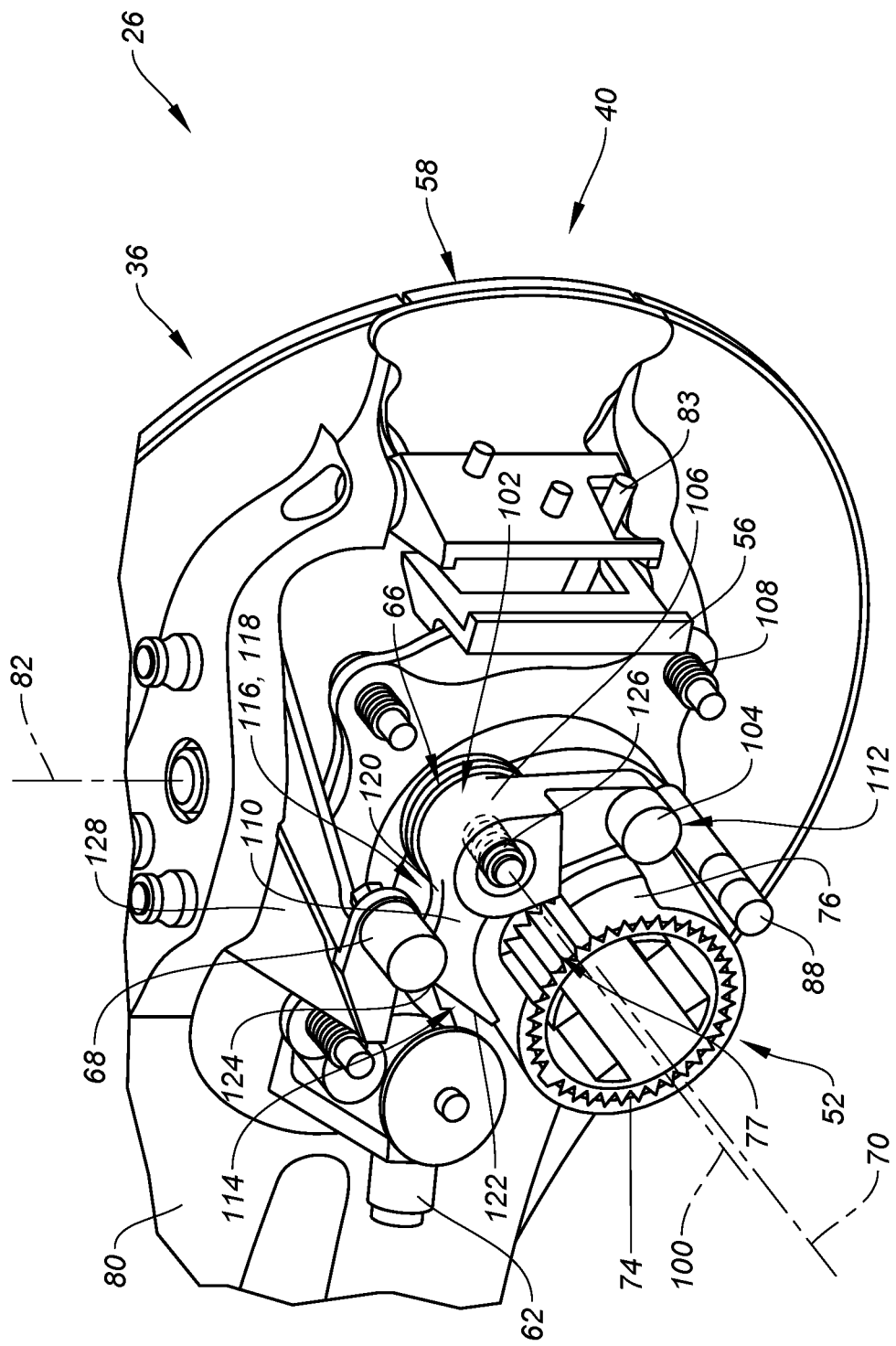
Figure 7C:
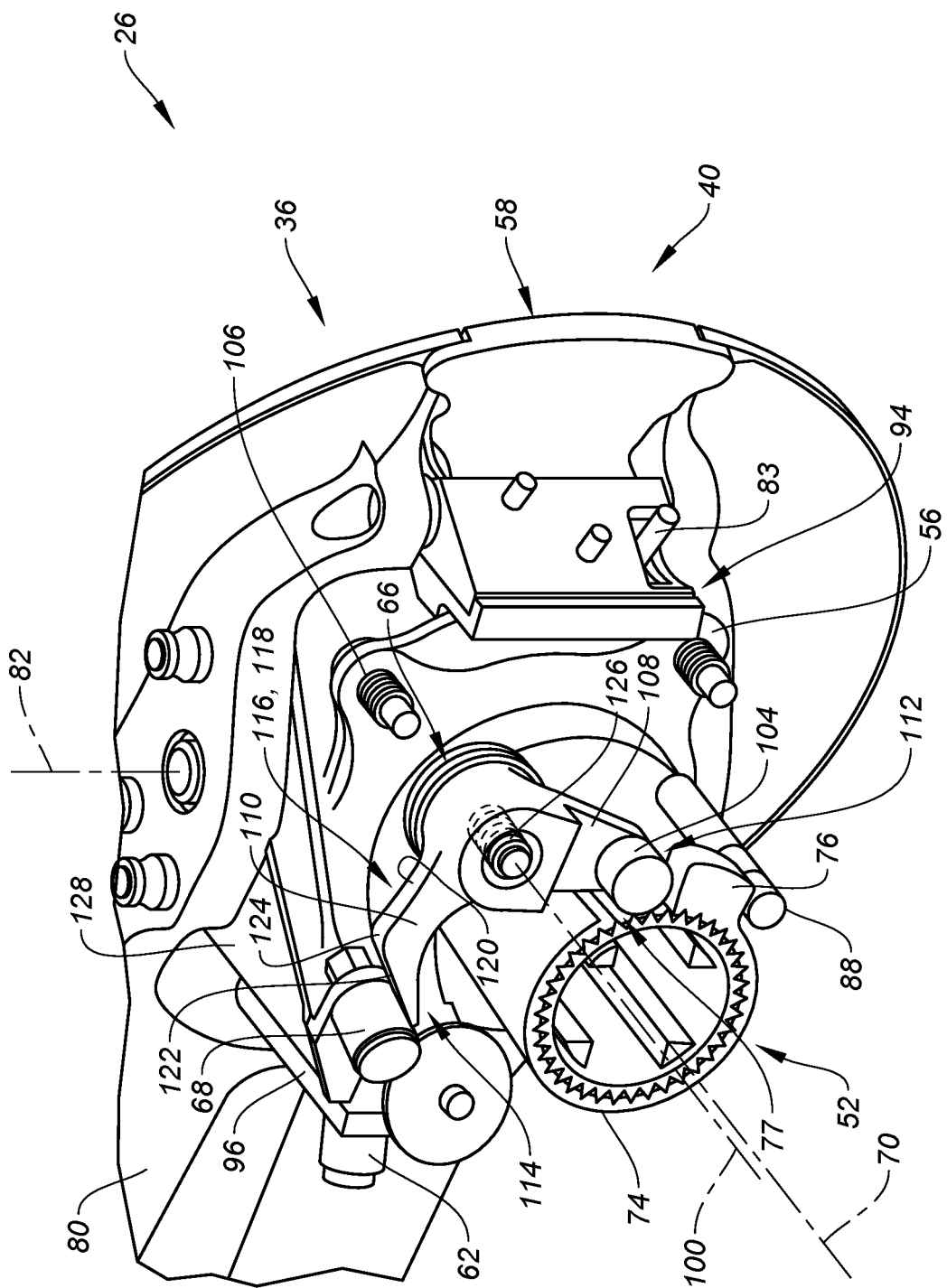

In operation of the clutch assembly 40, rotation of the exterior handle body 80 about the rotational axis 82 causes the control roller 68 to roll along the roller track 116. With the exterior handle body 80 in its engaged position, as shown in FIGS. 7A and 7B, the control roller 68, in contact with the roller track 116 (e.g., the first surface portion 120), holds the clutch lever 66 in the disengaged pivot position against the biasing force of the biasing member 126. In this disengaged pivot position of the clutch lever, the clutch roller 104 is disposed radially outward of the handle tooth 76, thereby allowing the interior door handle 34 and its shaft 52 to rotate about the door handle rotational axis 70 freely between the latched position and the unlatched position of the interior door handle 34 without engaging the exterior door handle 36 (e.g., without imparting rotation or other movement upon the exterior door handle 36). As the exterior handle body 80 is rotated about the rotational axis 82 from its engaged position to its disengaged position, the control roller 68 rolls along the roller track 116 in a direction from the center portion 106 toward the second distal end 114 (e.g., from the first surface portion 120, over the edge 124, and onto the second surface portion 122). With the exterior handle body 80 in its disengaged position, as shown in FIG. 7C, the position of the control roller 68 relative to the roller track 116 permits the biasing member 126 to bias the clutch lever 66 in the engaged pivot position. In this engaged pivot position of the clutch lever 66, the clutch roller 104 is disposed radially coincident with the handle tooth 76 with the handle tooth 76 disposed circumferentially between (e.g., circumferentially fixed between) the clutch roller 104 and the fixed body portion 88, thereby permitting operation of the door 28 using the exterior door handle 36. In other words, the handle tooth 76 fixed between the clutch roller 104 and the fixed body portion 88 rotationally couples the exterior coupling body 56 to the shaft 52 such that rotation of the exterior coupling body 56 about the door handle rotational axis 70 (e.g., as driven by rotation of the exterior handle body 80) drives rotation of the shaft 52 for operation of the door 28. Accordingly, the clutch assembly 40 of the present disclosure facilitates (1) opening the door 28 using the exterior door handle 36 (e.g., when the clutch lever 66 is in the engaged pivot position) as well as (2) opening the door 28 using the interior door handle 34 without, for example, motion of exterior door handle 36 (e.g., when the clutch lever 66 is in the disengaged pivot position).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A door assembly for an aircraft, the door assembly comprising:
a door;
an interior door handle and an exterior door handle, and the interior door handle and the exterior door handle are rotatable about a door handle rotational axis; and
a clutch assembly including a shaft of the interior door handle, an exterior coupling body of the exterior door handle, an exterior handle body of the exterior door handle, and a clutch lever,
the shaft extends along the door handle rotational axis to a distal end of the shaft, the shaft includes an interface portion at the distal end, and the interface portion includes a handle tooth,
the exterior coupling body extends circumferentially about the interface portion, and the exterior coupling body includes a fixed body portion disposed radially adjacent the interface portion, relative to the door handle rotational axis,
the exterior handle body is rotatably mounted to the exterior coupling body at a first rotational axis, and the exterior handle body is rotatable about the first rotational axis between and to an engaged position and a disengaged position, and
the clutch lever is rotatably mounted to the exterior coupling body at a second rotational axis, and the clutch lever is pivotable about the second rotational axis between and to an engaged pivot position and a disengaged pivot position, in the engaged pivot position, the handle tooth is positioned circumferentially between the clutch lever and the fixed body portion to rotationally couple the shaft and the exterior coupling body and, in the disengaged pivot position, the clutch lever is configured to permit rotation of the shaft independent of the exterior coupling body.

2. The door assembly of claim 1, wherein the clutch assembly further includes a control roller, the control roller is rotatably mounted to the exterior handle body, the control roller is positioned in contact with the clutch lever, in the engaged position of the exterior handle body, the control roller retains the clutch lever in the disengaged pivot position and, in the disengaged position of the exterior handle body, the control roller permits pivoting of the clutch lever from the disengaged pivot position to the engaged pivot position.

3. The door assembly of claim 2, wherein the clutch assembly further includes a biasing member biasing the clutch lever in the disengaged position.

4. The door assembly of claim 1, wherein the clutch lever includes a center portion, a first arm portion, and a second arm portion, the center portion is disposed at the second rotational axis, the first arm portion and the second arm portion extend radially outward from the center portion relative to the second rotational axis, and in the engaged pivot position, the handle tooth is positioned circumferentially between the clutch lever, at a first arm distal end of the first arm portion, and the fixed body portion to rotationally couple the shaft and the exterior coupling body.

5. The door assembly of claim 4, wherein the clutch lever includes a clutch roller rotatably mounted to the first arm portion at the first arm distal end, and in the engaged pivot position, the handle tooth is positioned circumferentially between the clutch roller and the fixed body portion to rotationally couple the shaft and the exterior coupling body.

6. The door assembly of claim 4, wherein the clutch assembly further includes a control roller, the control roller is rotatably mounted to the exterior handle body, the control roller is positioned in contact with a roller track of the second arm portion.

7. The door assembly of claim 6, wherein the control roller is configured to roll along the roller track in a direction from the second rotational axis toward a second arm distal end of the second arm portion as the exterior handle body rotates about the first rotational axis from the engaged position to the disengaged position.

8. The door assembly of claim 1, wherein the exterior coupling body includes one or more bearings contacting and rotatably supporting the shaft.

9. The door assembly of claim 1, wherein the clutch assembly further includes a handle push rotatably mounted to the exterior handle body, the handle push is rotatable between and to an engaged handle push position and a disengaged handle push position, in the engaged handle push position, the handle push is configured to prevent rotation of the exterior handle body from the engaged position to the disengaged position and, in the disengaged handle push position, the handle push is configured to permit rotation of the exterior handle body from the engaged position to the disengaged position.

10. The door assembly of claim 9, wherein the handle push is configured to contact the exterior coupling body, as the exterior handle body rotates from the engaged position to the disengaged position, to prevent further rotation of the exterior handle body about the first rotational axis in a disengagement rotational direction.

11. The door assembly of claim 1, wherein the clutch assembly further includes an exterior handle roller and a roller track, the exterior handle roller is rotatably mounted to the exterior handle body, outside of the disengaged position of the exterior handle body, the exterior handle roller is configured to contact the roller track to prevent rotation of the exterior door handle about the door handle rotation axis in an unlatching rotational direction and, in the disengaged position of the exterior handle body, the exterior handle roller is configured to be separated from the roller track to permit rotation of the exterior door handle about the door handle rotation axis in the unlatching rotational direction.

12. A door assembly for an aircraft, the door assembly comprising:
a door;
an interior door handle and an exterior door handle, and the interior door handle and the exterior door handle are rotatable about a door handle rotational axis; and
a clutch assembly including a shaft of the interior door handle, an exterior coupling body of the exterior door handle, an exterior handle body of the exterior door handle, and a clutch lever,
the exterior coupling body extends circumferentially about the shaft, and the exterior coupling body includes a fixed body portion disposed radially adjacent the shaft, relative to the door handle rotational axis,
the exterior handle body is rotatably mounted to the exterior coupling body at a first rotational axis, and the exterior handle body is rotatable about the first rotational axis between and to an engaged position and a disengaged position, and
the clutch lever includes a center body portion, a first arm portion, a second arm portion, and a clutch roller, the center body portion is rotatably mounted to the exterior coupling body at a second rotational axis, the clutch roller is rotatably mounted to the first arm portion, and the clutch lever is pivotable about the second rotational axis between and to an engaged pivot position and a disengaged pivot position, in the engaged pivot position, the shaft is positioned circumferentially between the clutch roller and the fixed body portion to rotationally couple the shaft and the exterior coupling body and, in the disengaged pivot position, the clutch roller is disposed radially outward of the shaft relative to the door handle rotational axis.

13. The door assembly of claim 12, wherein the first rotational axis is substantially perpendicular to the door handle rotational axis.

14. The door assembly of claim 12, wherein the second rotational axis is substantially parallel to the door handle rotational axis.

15. The door assembly of claim 12, wherein the clutch assembly further includes a control roller, the control roller is rotatably mounted to the exterior handle body, the control roller is positioned in contact with the second arm portion, in the engaged position of the exterior handle body, the control roller retains the clutch lever in the disengaged pivot position and, in the disengaged position of the exterior handle body, the control roller permits pivoting of the clutch lever from the disengaged pivot position to the engaged pivot position.

16. The door assembly of claim 12, wherein the first arm portion is circumferentially offset from the second arm portion relative to the second rotational axis.

17. A door assembly for an aircraft, the door assembly comprising:
a door;
an interior door handle and an exterior door handle, and the interior door handle and the exterior door handle are rotatable about a door handle rotational axis; and
a clutch assembly including a shaft of the interior door handle, an exterior coupling body of the exterior door handle, an exterior handle body of the exterior door handle, a clutch lever, and a control roller, the exterior coupling body extends circumferentially about the shaft, and the exterior coupling body includes a fixed body portion disposed radially adjacent the shaft, relative to the door handle rotational axis, the exterior handle body is rotatably mounted to the exterior coupling body at a first rotational axis, and the exterior handle body is rotatable about the first rotational axis between and to an engaged position and a disengaged position, the clutch lever is rotatably mounted to the exterior coupling body at a second rotational axis, and the clutch lever is pivotable about the second rotational axis between and to an engaged pivot position and a disengaged pivot position, in the engaged pivot position, the shaft is positioned circumferentially between the clutch lever and the fixed body portion to rotationally couple the shaft and the exterior coupling body and, in the disengaged pivot position, the clutch lever is configured to permit rotation of the shaft independent of the exterior coupling body, and the control roller is rotatably mounted to the exterior handle body, the control roller is positioned in contact with the clutch lever, in the engaged position of the exterior handle body, the control roller retains the clutch lever in the disengaged pivot position and, in the disengaged position of the exterior handle body, the control roller permits pivoting of the clutch lever from the disengaged pivot position to the engaged pivot position.

18. The door assembly of claim 17, wherein the clutch assembly further includes a biasing member biasing the clutch lever in the disengaged position.

19. The door assembly of claim 17, wherein the clutch lever includes a center portion, a first arm portion, and a second arm portion, the center portion is disposed at the second rotational axis, the first arm portion and the second arm portion extend radially outward from the center portion relative to the second rotational axis, and in the engaged pivot position, the shaft is positioned circumferentially between the clutch lever, at a first arm distal end of the first arm portion, and the fixed body portion to rotationally couple the shaft and the exterior coupling body.

20. The door assembly of claim 19, wherein the clutch lever includes a clutch roller rotatably mounted to the first arm portion at the first arm distal end and, and in the engaged pivot position, the shaft is positioned circumferentially between the clutch roller and the fixed body portion to rotationally couple the shaft and the exterior coupling body.

* * * * *